US007393040B2

(12) United States Patent
Guillez et al.

(10) Patent No.: US 7,393,040 B2
(45) Date of Patent: Jul. 1, 2008

(54) DEVICE FOR CONTROLLING THE OPENING AND CLOSING OF A TRUNK HOOD

(75) Inventors: Jean-Marc Guillez, Cirieres (FR); Paul Queveau, Montravers (FR); Gererd Queveau, Le Pin (FR)

(73) Assignee: Societe Europeenne Des Brevets Automobiles, Paris (FR)

( * ) Notice: Subject to any disclaimer, the term of this patent is extended or adjusted under 35 U.S.C. 154(b) by 678 days.

(21) Appl. No.: 10/500,380

(22) PCT Filed: Dec. 31, 2002

(86) PCT No.: PCT/FR02/04591

§ 371 (c)(1),
(2), (4) Date: Mar. 18, 2005

(87) PCT Pub. No.: WO03/060270

PCT Pub. Date: Jul. 24, 2003

(65) Prior Publication Data

US 2005/0156446 A1 Jul. 21, 2005

(30) Foreign Application Priority Data

Jan. 4, 2002 (FR) .................................. 02 00104

(51) Int. Cl.
*B62D 25/12* (2006.01)

(52) U.S. Cl. ............................................ 296/76; 49/32

(58) Field of Classification Search .................. 296/76, 296/146.4; 49/32, 340

See application file for complete search history.

(56) References Cited

U.S. PATENT DOCUMENTS

| | | | | |
|---|---|---|---|---|
| 2,535,600 | A * | 12/1950 | Rappl | 296/76 |
| 3,678,623 | A * | 7/1972 | Jenkins | 49/43 |
| 3,762,099 | A * | 10/1973 | Chaisson | 49/360 |
| 4,154,023 | A * | 5/1979 | Carroll | 49/32 |
| 4,995,194 | A * | 2/1991 | Schultze et al. | 49/32 |
| 5,647,173 | A * | 7/1997 | Stark et al. | 49/506 |
| 5,944,376 | A * | 8/1999 | Buchanan, Jr. | 296/146.4 |
| 6,217,105 | B1 * | 4/2001 | Hollerbach | 296/146.4 |

FOREIGN PATENT DOCUMENTS

DE 19927871 * 11/1999

* cited by examiner

*Primary Examiner*—Dennis H Pedder
(74) *Attorney, Agent, or Firm*—Bachman & LaPointe, P.C.

(57) ABSTRACT

A device designed to control opening and closing of a trunk hood comprises a jack whereof the cylinder is pivotably linked to the vehicle body and the free end of the piston rod sliding in the cylinder is linked to the hood in articulation. The device further has a control member arranged between the hood and the free end of the piston rod and designed to detect a force in the direction closing the hood and to control actuation of the jack in the direction for closing the hood.

7 Claims, 1 Drawing Sheet

DEVICE FOR CONTROLLING THE OPENING AND CLOSING OF A TRUNK HOOD

BACKGROUND OF THE INVENTION

This invention relates to a device for controlling the opening and closing of a motor vehicle trunk hood, particularly a luggage compartment.

A device is known for controlling the opening and closing of a trunk hood of the type comprising a jack for which the cylinder is linked to the vehicle bodywork in a manner free to pivot, and in which the rod sliding in the cylinder is linked to the hood in an articulated manner at its free end.

One disadvantage of a device suitable for controlling automatic closing of a hood is that a person who wants to quickly put down luggage or pick it up in the trunk can get trapped. The same is true if a person accidentally puts his hands in the immediate vicinity of the trunk.

Another disadvantage of such a device for controlling the automatic closing of a hood is that a piece of luggage badly positioned in the trunk can hinder closing of the hood and either damage the device or damage the luggage.

Some users need to be reassured that automatic closing of the hood will not cause any deterioration to the closing device or to badly positioned luggage, even if the hood is equipped with a device for preventing the closing movement from continuing if luggage hinders closing of the hood.

SUMMARY OF THE INVENTION

The purpose of the invention is a device for controlling the opening and closing of a hood in a safe manner, so that the user has the impression of closing the hood manually, even though closing is done automatically.

According to the invention, the device of the type mentioned above comprises a control member placed between the hood and the free end of the rod, for detecting a force in the hood closing direction and controlling activation of the jack in the hood closing direction.

Thus, a user who wants to close the hood on the trunk applies a force to the trunk in the closing direction. The control member detects this force and in response to this detection, orders activation of the jack in the hood closing direction. In this way, the user directly controls closing of the hood, accompanying the closing movement generated by the jack, and he has the impression of closing the hood himself.

Other special features of this invention will become clear from the following description.

BRIEF DESCRIPTION OF THE DRAWINGS

In the appended drawings, given as non-limitative examples.

DETAILED DESCRIPTION OF THE PREFERRED EMBODIMENT(S)

Figure 1:
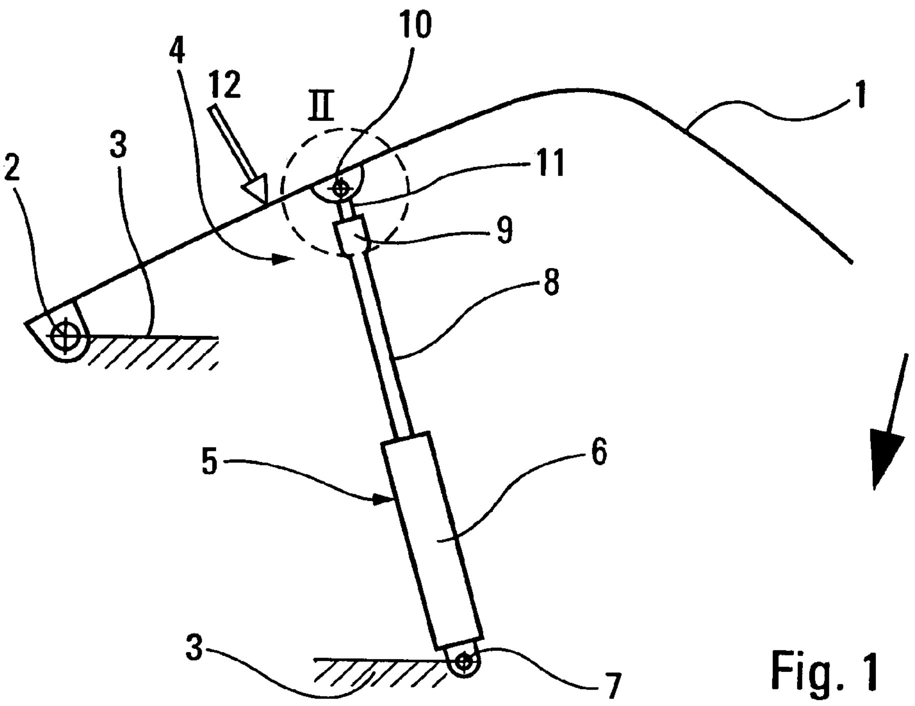
FIG. 1 shows a diagrammatic sectional view of a device according to one embodiment of this invention.

A hood 1 is linked in an articulated manner about a rotation hinge pin 2 to a motor vehicle bodywork shown diagrammatically at 3 between an open position shown in FIG. 1 and a closed position. The vehicle includes a device 4 for controlling opening and closing of the hood 1 and that includes a jack 5. The jack 5 is a double acting jack of an arbitrary known type.

As is known and illustrated in FIG. 1, the jack 5 comprises a cylinder 6 that is linked to the bodywork 3 in a manner free to pivot, about a pivot pin 7, and a rod 8 that is installed free to slide in the cylinder 6 and that is linked at its free end 9 to the hood 1 in an articulated manner about a second pivot pin 10.

According to this invention, the device 4 for controlling the opening and closing of the hood 1 comprises a control member 11.

Figure 2:
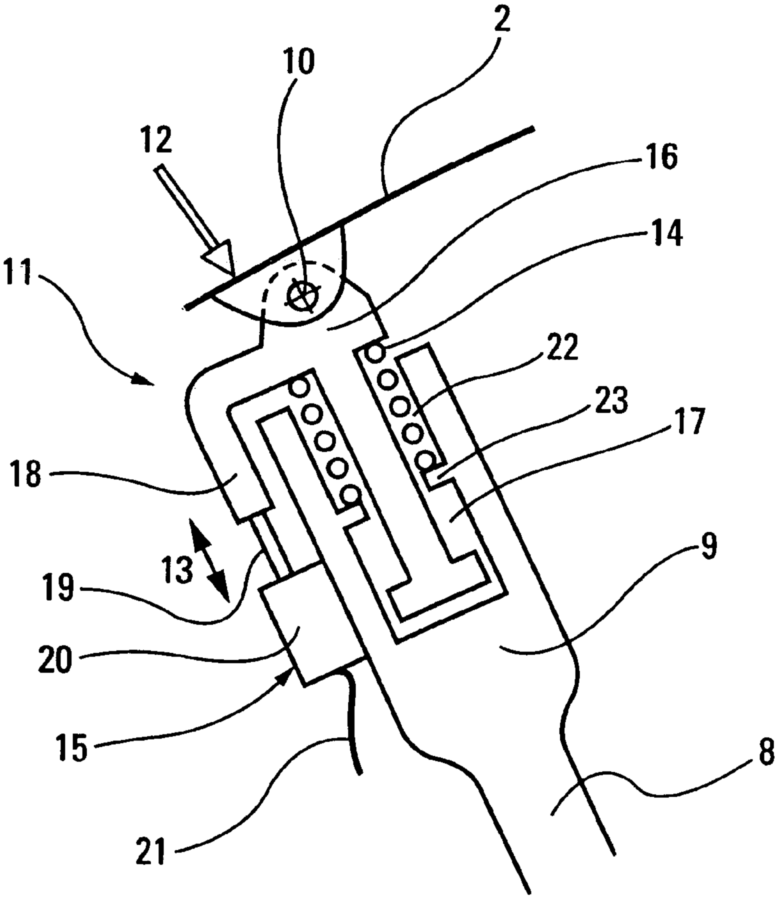
FIG. 2 shows an enlargement of region II illustrated in FIG. 1 representing an embodiment of a control member for the device in FIG. 1.

As illustrated in FIG. 2, the control member 11 is placed between the hood 1 and the free end 9 of the rod 8. The member 11 is capable of detecting a force 12 applied on the hood 1 in the closing direction of the hood 1 and controlling activation of the jack 5 in the hood 1 closing direction.

In the example illustrated in FIG. 2, the control member 11 is linked firstly to the free end 9 of the rod 8 deformably in translation (represented by double arrow 13) substantially along the longitudinal direction of the rod 8 between a remote position and a close position, and secondly to the hood 1 free to pivot about the second pivot pin 10.

The control member 11 includes an element 14 for continuously applying a force on the hood 1 pulling it towards its remote position from the free end 9 of the rod 8, so as to substantially compensate the weight of the hood 1. Consequently, the only means of making the hood 1 move into a close position is to apply a force 12 onto the hood 1.

The control member 11 also comprises a contact switch 15 for detecting a close position of the hood 1 and controlling activation of the jack 5 in the closing direction of the hood 1.

The control member 11 comprises a sliding element 16 that slides with respect to the rod 8 of the jack 5. More precisely, the sliding element 16 slides in a chamber 17 made at the free end 9 of the rod 8 between a retracted position in the rod 8, shown in FIG. 2, in which the hood 1 is in a close position to the free end 9, and an extended position in which the hood 1 is in its remote position from the free end 9.

In the example illustrated in FIG. 2, the elastic element 14 is a compression spring 14 placed in a housing 22 and continuously applying a force to the sliding element 16 in its deployed position outside the chamber 17. The housing 22 is separated from the chamber 17 by a partition 23 through which the sliding element 16 passes and with which the spring 14 comes into contact through one of its ends (the other end being in contact with the sliding element 16).

The sliding element 16 comprises a pin 18 for activating the contact switch 15 when the sliding element 16 is in a retracted position, so as to activate the contact switch 15. The contact switch 15 comprises a straight edge 19 sliding in a housing 20 that is fixed to the free end 9 of the rod 8. The contact switch 15 is electrically linked by a cable 21 to actuation means of the jack 5 in the closing direction of the hood 1, these actuation means of the mechanism being any known type of means, for example a hydraulic control unit.

If the user wants to close the hood 1, he applies a force 12 onto the hood in the closing direction that moves against the force applied by the spring 14. The hood 1 reaches a position close to the free end 9 of the rod 8, and at the same time the sliding element 16 reaches a retracted position in which the pin 18 causes sliding of the straight edge 19. After the contact switch 15 is actuated, the movement of the jack 5 in the closing direction of the hood 1 is generated.

Every time that the user stops applying the force 12 in the closing direction of the hood 1, the spring 14 directs the sliding element 16 into its extended position, which deactivates the contact switch 15 and stops the closing movement of the jack 5. Every new force 12 reactivates the contact switch 15 and recloses the hood 1.

Thus, the result is a device for assisted closing of the luggage compartment hood 1.

Obviously, this invention is not limited to the embodiment that has just been described, and many changes and modifications could be made to it without going outside the framework of the invention.

For example, the control member 11 could be linked firstly to the hood 1 free to move in translation between a remote position and a close position, and secondly to the free end 9 of the rod 8 in an articulated manner about the second hinge pin 10.

Any control member 11 placed between the hood 1 and the free end 9 of the rod 8 for detecting a force 12 applied to the hood 1 in the hood closing direction and controlling activation of the jack 5 in the closing direction of the hood 1 would be suitable for carrying out this invention, and for example it could be composed of a piezo-electric element or a hydraulic element or an electromagnetic element.

The invention claimed is:

1. A device for controlling the opening and closing of a trunk hood comprising a jack having a cylinder linked to vehicle bodywork in a manner free to pivot, and a rod sliding in the cylinder and linked to the hood in an articulated manner at a free end, a control member placed between the hood and the free end of the rod, for detecting a force in a hood closing direction and controlling activation of the jack in the hood closing direction.

2. The device according to claim 1, wherein the control member is linked to the free end of the rod deformably in translation substantially along a longitudinal direction of the rod between a remote position and a close position, and to the hood, said control member being free to pivot about a pivot pin.

3. The device according to claim 2, wherein the control member comprises a sliding element that slides with respect to the free end of the rod between a retracted position in which the hood is in a close position with respect to the free end, and an extended position in which the hood is in a remote position from the free end.

4. The device according to claim 3, further comprising an element for continuously applying a force on the hood pulling it towards said remote position, so as to substantially compensate for the weight of the hood.

5. The device according to claim 4, wherein the element is a compression element placed between a sliding element and the rod.

6. The device according to claim 3, further comprising a contact switch for detecting a close position of the hood and controlling activation of the jack in the closing direction of the hood.

7. The device according to claim 6, wherein the sliding element comprises a pin for activating the contact switch when the sliding element is in a retracted position.

* * * * *

UNITED STATES PATENT AND TRADEMARK OFFICE

CERTIFICATE OF CORRECTION

PATENT NO. : 7,393,040 B2
APPLICATION NO. : 10/500380
DATED : July 1, 2008
INVENTOR(S) : Jean-Marc Guillez et al.

It is certified that error appears in the above-identified patent and that said Letters Patent is hereby corrected as shown below:

On the title page, item [75]:
The third named inventor “Gererd Queveau” should be corrected to read --Gerard Queveau--.

On the title page, item [73]:
The Assignee information listed on the patent “Societe Europeenne des Brevets Automobiles” is in error. The assignee information should read as follows: --Societe Europeene de Brevets Automobiles--.

Signed and Sealed this

Third Day of March, 2009

JOHN DOLL
*Acting Director of the United States Patent and Trademark Office*